United States Patent [19]
Akamine

[11] 3,860,960
[45] Jan. 14, 1975

[54] MAGNETIC RECORDING AND REPRODUCING APPARATUS WITH TAPE EXTRACTION

[75] Inventor: Takenori Akamine, Osaka, Japan

[73] Assignee: Matsushita Electric Industrial Co., Ltd., Osaka, Japan

[22] Filed: Sept. 13, 1972

[21] Appl. No.: 288,545

[30] Foreign Application Priority Data

Sept. 21, 1971 Japan .......................... 46-73588

[52] U.S. Cl. .................................................. 360/85
[51] Int. Cl. ...................... G11b 15/66, G11b 23/04
[58] Field of Search ............. 179/10.2 T, 100.2 ZA; 360/95, 85

[56] References Cited

UNITED STATES PATENTS 3,612,539 10/1971 Itzum et al. ............... 179/100.2 ZA
3,702,383 11/1972 Inaga et al.................... 179/100.2 T

*Primary Examiner*—Bernard Konick
*Assistant Examiner*—David K. Moore
*Attorney, Agent, or Firm*—Wenderoth, Lind & Ponack

[57] ABSTRACT

A magnetic recording and reproducing apparatus has a guide drum including a magnetic head, take out means for taking out a tape from an opening of a cartridge and spreading the tape into a loop, and tape guiding means including at least one tape guide pin which is inserted into the loop of the tape and rotates around the guide drum to guide the tape against the periphery of the guide drum.

8 Claims, 9 Drawing Figures

PATENTED JAN 14 1975

3,860,960

SHEET 3 OF 5

MAGNETIC RECORDING AND REPRODUCING APPARATUS WITH TAPE EXTRACTION

This invention relates to a magnetic recording and reproducing apparatus, and more particularly to a magnetic recording and reproducing apparatus having means for taking out a tape from a cartridge and guiding said tape against the periphery of a guide drum.

In a conventional video tape recorder, the tape must be guided against the periphery of a guide drum by hand. This is quite troublesome for an unskilled operator. For this reason, a cartridge type video tape recorder has recently been developed in which the tape is automatically guided against the periphery of the guide drum. In a certain model of such a cartridge type video tape recorder, a plurality of guide pins are first inserted into a cartridge, and then said pins move around the guide drum to guide the tape against the guide drum automatically. The cartridge for such a video tape recorder must be provided with a large opening for receiving a plurality of guiding pins. Dust may easily enter the cartridge through said opening, and the tape can easily be spoiled or damaged. Therefore, the cartridge is provided with a dust cover to close the opening when the cartridge is removed from the video tape recorder. However, such a cartridge has a complicated construction.

Accordingly, an object of the present invention is to provide an improved magnetic recording and reproducing apparatus having novel means for taking out a tape through a small opening in a cartridge and guiding the tape against a guide drum.

Another object of the present invention is to provide an improved magnetic recording and reproducing apparatus wherein a tape in a cartridge is taken out through a small opening of the cartridge in a narrow loop, and said narrow loop of the tape is spread into a wide loop, and then the tape is guided against a guide drum.

Still another object of the present invention is to provide an improved magnetic recording and reproducing apparatus as defined in the preceding paragraph with novel means for taking out a tape through a small opening of a simply constructed cartridge and novel guiding means which is reliable in operation and inexpensive to manufacture.

These objects are achieved by providing a magnetic recording and reproducing apparatus according to the present invention which comprises a guide drum including a magnetic head, take out means for taking out a tape through an opening of a cartridge and spreading said tape into a loop, and tape guiding means including at least one tape guide pin which is inserted into the loop of the tape, and guide pin moving means on which said pin is mounted and movable around said guide drum to guide the tape against a portion of the periphery of the guide drum, whereby said tape guide pin serves as a guide for positioning the tape in a predetermined path while the tape is moving.

Further objects and advantages will become apparent from the following detailed description taken in connection with the accompanying drawings in which.

Figure 1:
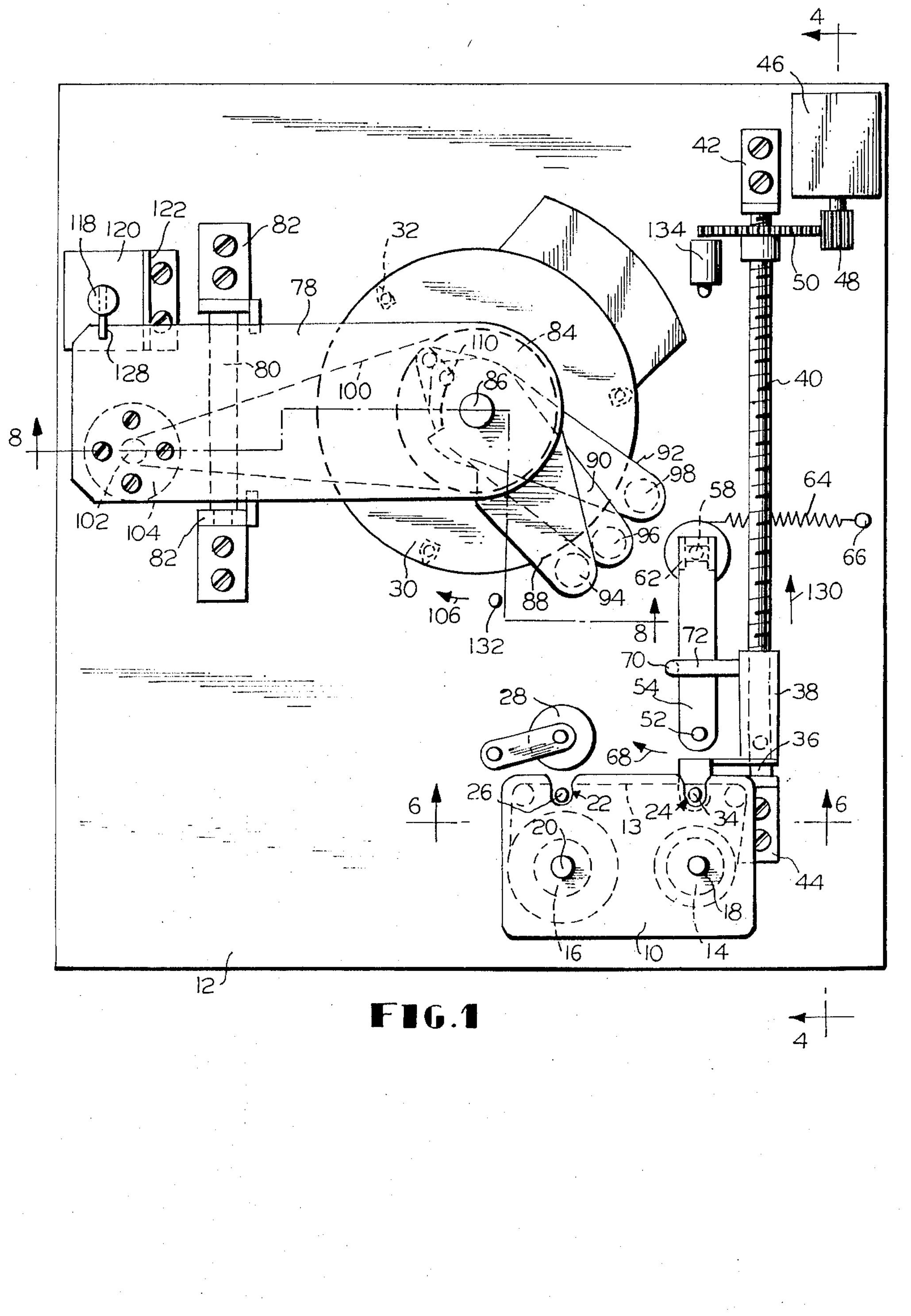
FIG. 1 is a top plan view of an apparatus embodying the invention.

Referring now to the drawings, there will be described one embodiment of a magnetic recording and reproducing apparatus according to the present invention.

This apparatus is constructed so as to be useful for handling a reel-to-reel type cartridge, especially a cassette 10 as shown in FIG. 1. However, the present invention is not limited to use only for a cassette as shown in FIG. 1, but it is also useful for other types of cartridges, such as an endless tape cartridge.

As shown in FIG. 1, the cassette 10 is set on a tape deck 12 so as to be engaged with tape moving means. Said cassette 10 has therein a magnetic tape 13 wound on two reels 14 and 16 which are coupled to reel drive spindles 18 and 20 respectively. Said cassette 10 is provided with two openings 22 and 24. A tape drive capstan 26 is inserted into the opening 22 and is adapted to drive the tape 13 in conjunction with a pressure roller 28.

The tape 13 is taken out of the cassette 10 and guided against the periphery of a tape guide drum 30 by take out means and tape winding means which will be described hereinafter. Said guide drum 30 has a plurality of magnetic video heads 32 rotatably mounted therein to record on or playback from the tape 13 against the periphery of the guide drum 30.

A take out pin 34 is inserted into the opening 24 of the cassette 10. Said pin 34 is fixedly mounted on an arm 36 which is attached to a carriage 38. Said carriage 38 is mounted on a lead screw 40 and moves on a straight line along said lead screw 40 during rotation of the screw 40. Said lead screw 40 is rotatably supported in brackets 42 and 44 and driven by a motor 46 through gears 48 and 50.

Figure 4:
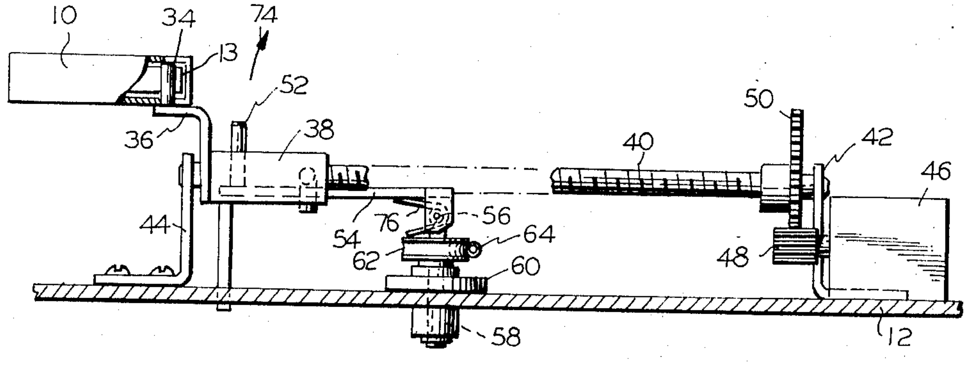
FIG. 4 is a sectional view of the apparatus taken along the line 4—4 of FIG. 1.
Figure 7:
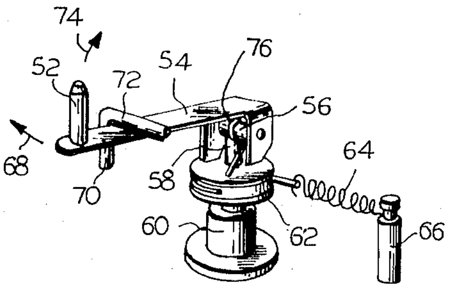
FIG. 7 is a fragmentary perspective view of the take out means.

Referring to FIG. 1, FIG. 4, and FIG. 7 a spreading pin 52 is fixedly mounted on a swingable arm 54 which is pivotally mounted on an upper horizontal pin 56 of a T-shaped shaft 58. Said shaft 58 is rotatably mounted on a bearing 60 which is mounted on the tape deck 12. Therefore, said swingable arm 54 can swing not only vertically but horizontally around said T-shaped shaft 58. The shaft 58 has a wheel 62 connected, the other end of said spring 64 being anchored to a pin 66 fixed on the tape deck 12 so that the swingable arm 54 is urged to swing in the direction of the arrow 68 in FIG. 1 and FIG. 7 by said spring 64. Said swinging motion of said arm 54 is restricted by a bent portion 70 of a stop pin 72 which is affixed to the carriage 38. Said swingable arm 54 is also urged to swing in the direction of the arrow 74 in FIG. 4 and FIG. 7 by a torsion spring 76 which is mounted on the upper horizontal pin 56 of the T-shaped shaft 58. Said swinging motion of said arm 54 is also restricted by the stop pin 72 when the carriage 38 is in the position shown in FIG. 1 and FIG. 4.

Figure 8:
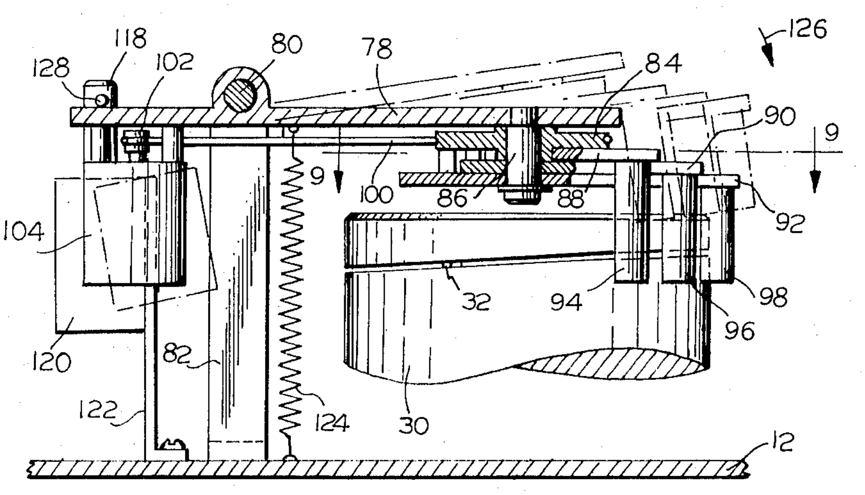
FIG. 8 is a sectional view of tape winding means in the apparatus taken along the line 8—8 of FIG. 1.
Figure 9:
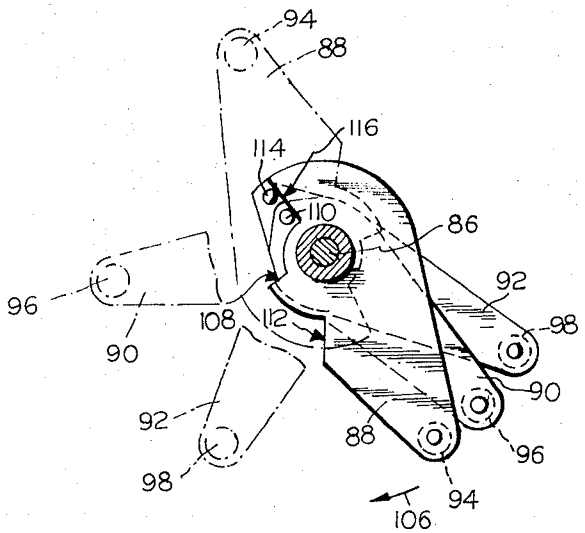
FIG. 9 is a sectional view of the guide means in guiding operation taken along the line 9—9 of FIG. 8.

With reference to FIGS. 1, 8 and 9, a swingable bracket 78 is fixedly mounted on a horizontal shaft 80 which is rotatably supported on supports 82 on the tape deck 12. A pulley 84 is rotatably mounted on a center shaft 86 which is secured to one end of said swingable bracket 78. A first guide arm 88 is permanently affixed to said pulley 84 so as to rotate with said pulley 84 as a single unit. A second guide arm 90 and a third guide arm 92 are coaxially and rotatably mounted on said center shaft 86. A first tape guide pin 94 is fixed to the free end of the first guide arm 88, a second tape guide pin 96 is fixed to the free end of the second guide arm 90, and a third tape guide pin 98 is fixed to the free end of the third guide arm 92. These pins 94, 96 and 98 extend downwardly from the guide arms 88, 90 and 92. At respective first positions as shown in FIG. 1 said guide arms 88, 90 and 92 are arranged to be close to each other so that the tape guide pins 94, 96 and 98 are side by side. An endless belt 100 is connected between said pulley 84 and a drive pulley 102 of a motor 104 which is mounted on the other end of the swingable bracket 78.

With reference to FIG. 9, upon rotation of said motor 104, the pulley 84 rotates to swing the first guide arm 88 in the direction of the arrow 106. The first guide arm 88 is provided with a first driving edge 108 engageable with a driven pin 110 fixed on the second guide arm 90, and a second driving edge 112 engageable with a driven pin 114 fixed to the third guide arm 92. After the first guide arm 88 has rotated through a predetermined angle in the direction of the arrow 106, said first driving edge 108 engages with the driven pin 110 and drives the same to swing the second guide arm 90 in the same direction. When the first guide arm 88 has rotated further along with the second guide arm 90, said second driving edge 112 engages with the driven pin 114 and drives the same to swing the third guide arm 92 in the same direction. At the end of the rotation of these guide arms 88, 90 and 92, the tape guide pins 94, 96 and 98 occupy second positions indicated by dot-dash lines in FIG. 9. When the first guide arm 88 rotates in a direction opposite to the arrow 106, a third driving edge 116 drives the driven pins 110 and 114 sequentially so as to return the tape guide pins 94, 96 and 98 to the first positions.

With reference to FIG. 1 and FIG. 8, the other end of the swingable bracket 78 is coupled to a plunger 118 of a solenoid 120 which is attached by means of a pin 128 to a supporting plate 122 secured to the tape deck 12. The swingable bracket 78 is urged by a tension spring 124 in the direction of the arrow 126, but is restricted by bent tabs 128 on the supports 82 to occupy the position indicated by solid lines in FIG. 8.

Upon energization of the solenoid 120, the pin 128 on the plunger 118 drives the swingable bracket 78 to swing it around the shaft 80 so that the swingable bracket 78 occupies the position indicated by dot-dash lines in FIG. 8.

Figure 5:
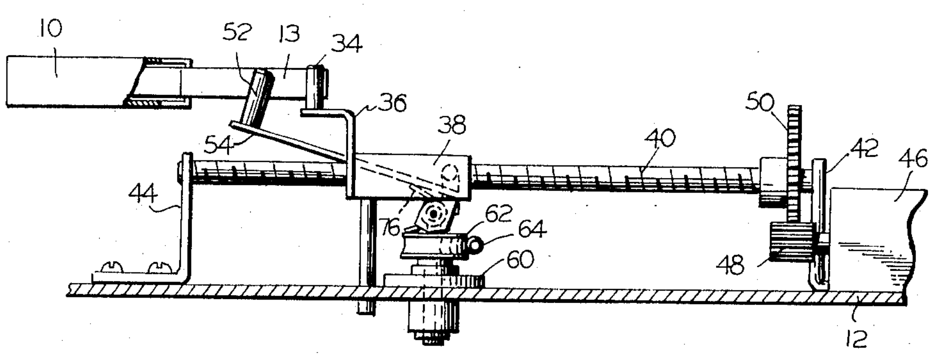
FIG. 5 is a sectional view of the apparatus similar to FIG. 4, but in a state wherein the tape is being taken out of the opening of the cartridge.
Figure 6:
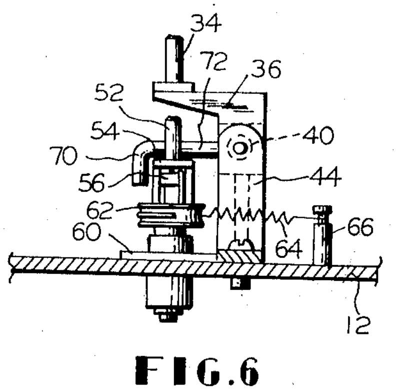
FIG. 6 is a fragmentary elevational sectional view of take out means in the apparatus taken along the line 6—6 of FIG. 1.

At the same time upon energization of the motor 46, the lead screw 40 begins to rotate to move the carriage 38 in the direction of the arrow 130 in FIG. 1 so that the tape 13 is taken out of the cassette 10 by the take out pin 34 as shown in FIG. 5. When the carriage 38 is brought to the position indicated by dot-dash lines in FIG. 2, the stop pin 72 is disengaged from the swingable arm 54 to release the same so that the swingable arm 54 swings in the direction of the arrow 74 to insert the spreading pin 52 into the narrow loop of the tape 13 which is taken out by the take out pin 34 as shown in FIG. 5.

Figure 2:
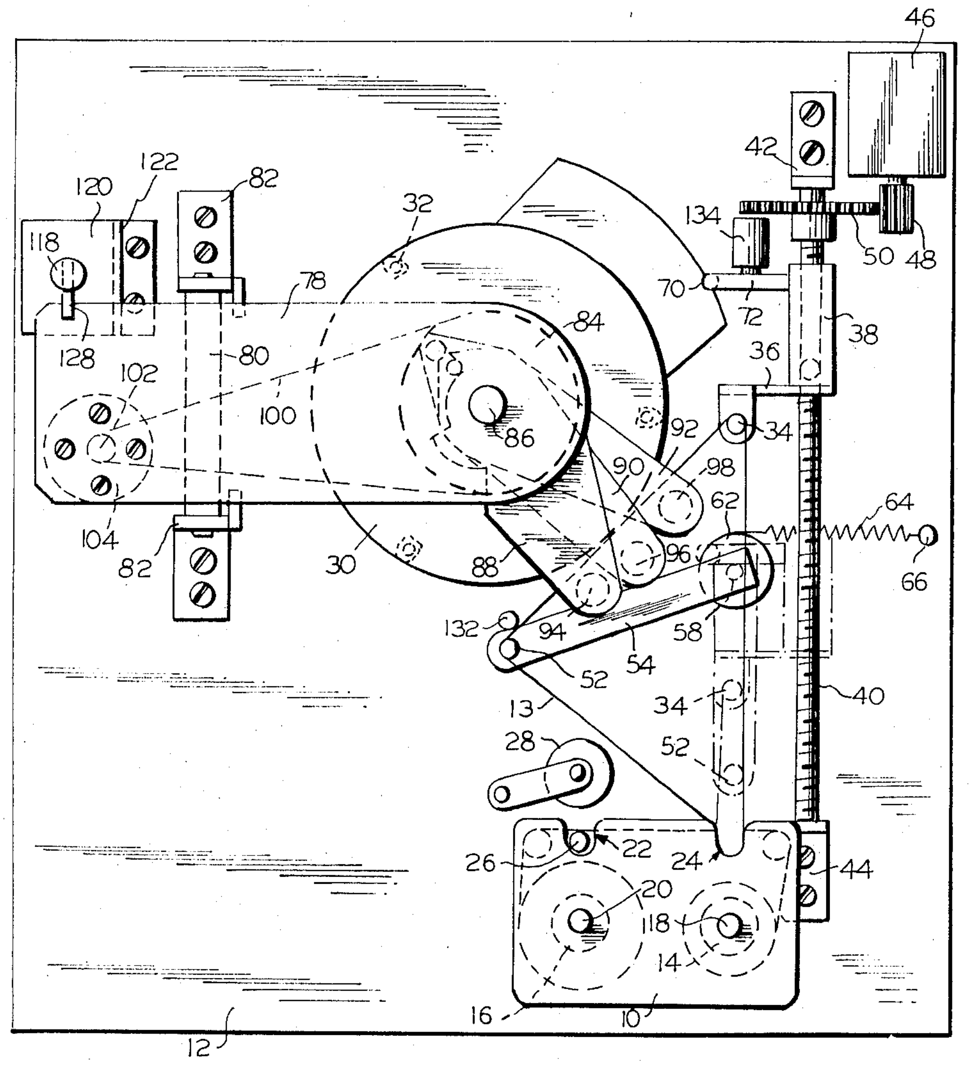
FIG. 2 is a top plan view of the apparatus of FIG. 1, but in a state wherein the tape has been taken out through an opening in a cartridge and spread into a loop.
Figure 3:
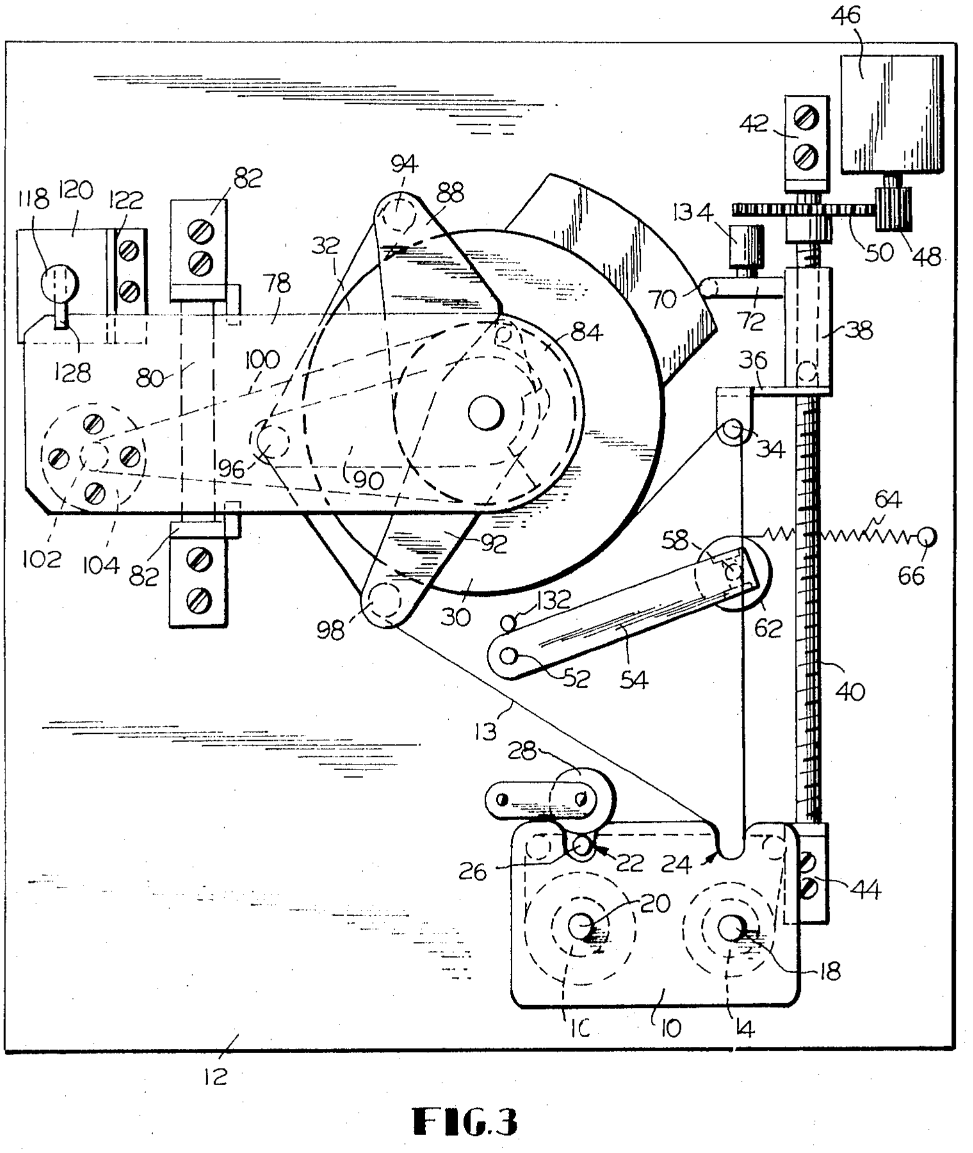
FIG. 3 is a top plan view of the apparatus of FIG. 1, but in a state wherein the tape is being guided around the periphery of a guide drum.

Upon further movement of the carriage 38 in the direction of the arrow 130, the swingable arm 54 is released from the bent portion 70 of the stop pin 72 so that it swings in the direction of the arrow 68 under the biasing force of the spring 64 till the swingable arm 54 is pressed to a pin 132 as shown in FIG. 2. Therefore, the spreading pin 52 spreads the tape 13 into a wide loop. When the carriage 38 reaches to the position indicated by solid lines in FIG. 1, the stopper pin 72 actuates a micro-switch 134 to switch off the motor 46 so that the carriage 38 stops its movement. Upon actuation of the micro-switch 134, the solenoid 120 is deenergized and the swingable bracket 78 swings back to the position indicated by the solid lines in FIG. 8 under the biasing force of the spring 124 so that the three tape guide pins 94, 96 and 98 move downward and are inserted into the wide loop of the tape 13. Then, the motor 104 is energized to rotate the pulley 84 through the endless belt 100 so that the first guide arm 88 swings in the direction of the arrow 106. Accordingly, the first tape guide pin 94 moves arcuately around the tape guide drum 30 so as to guide the tape 13 against a portion of the periphery of the tape guide drum 30. Then, the second tape guide pin 96 and the third tape guide pin 98 move to their second positions following said first tape guide pin 94 to guide the tape 13 to prevent the tape in the part of the loops spaced from the drum 30 from touching the part of the tape against the drum as shown in FIG. 3.

Then, the pressure roller 28 is moved to press the tape against the capstan 26 to move the tape 13 from the reel 14 to the reel 16. With this movement of the tape 13, the tape is scanned by the rotating magnetic video heads 32 for the recording or the playback of the tape 13. In this condition, said tape guide pins 94, 96 and 98 serve as tape guides for guiding the tape in a predetermined path while the tape is moving.

After the recording or the playback of the tape 13, the tape 13 is returned into the cassette 10 as will be explained hereinafter.

Upon rotation of the motor 104 in the reverse direction, the guide arms 88, 90 and 92 swing back in a direction opposite to the arrow 106. The tape 13 forming the spread loop is rewound on the reel 14 by the reel drive spindle 18. When the tape guide pins 94, 96 and 98 return to the first positions as shown in FIG. 2, the motor 104 stops and the solenoid 120 is energized. Upon energization of the solenoid 120, the pin 128 on the plunger 118 pulls the swingable bracket 78 so that the tape guide pins 94, 96 and 98 move upward and are pulled out of the tape loop. Then, the motor 46 rotates in the reverse direction and the carriage 38 moves in a direction opposite to the arrow 130. During the return motion of the carriage 38, the stop pin 72 drives the swingable arm 54 to swing it horizontally to close the tape loop and also to swing it vertically to withdraw the spreading pin 52 from the tape loop. Then, the take out pin 34 returns to the opening 24 of the cassette 10 to return the tape 13 into the cassette 10 completely.

As stated above, only a single take out pin 34 is inserted in the opening 24 of the cassette 10 so that a small opening is sufficient to receive said take out pin 34. This means that the tape 13 in the cassette 10 can be easily protected from dust.

It is apparent that various modifications may be made without departing from the invention. The above described specific example is intended merely to illustrate the various facets in a certain selective embodiment of the invention, the scope of which it is intended shall be limited only by the following claims.

1. A magnetic recording and reproducing apparatus comprising:

a guide drum including a magnetic head;

take-out means for taking a tape out of an opening of a cartridge into a narrow loop; spreading means for spreading said narrow loop of the tape into a wide loop; and tape guiding means including at least one tape guide pin which is inserted into the wide loop of the tape, and guide pin moving means on which said pin is mounted and movable around said guide drum to guide the tape into contact with and to hold it against a portion of the periphery of the guide drum, whereby said tape guide pin serves as a guide for positioning the tape in a predetermined path while the tape is moving along said guide drum.

2. A magnetic recording and reproducing apparatus as claimed in claim 1 wherein, said tape guiding means includes a plurality of guide arms, each of which has a tape guide pin fixed to one free end thereof respectively, and each being mounted for swinging movement around said guide drum between a first position and a second position to guide the tape against a portion of the periphery of the guide drum, in the first position said guide arms being close to each other with the tape guide pins side by side so that said guide pins can all be inserted in the spread loop of the tape at one time, and in the second position said guide arms being apart from each other for positioning the tape guide pins separately around the guide drum.

3. A magnetic recording and reproducing apparatus as claimed in claim 2 wherein, said tape guide means further comprises drive means coupled to a first one of the tape guide arms for first moving the tape guide pin on said first tape guide arm around the guide drum to guide the tape around the periphery of the guide drum at first, and coupling means for coupling the guide arms for moving the other guide arms with the other tape guide pins around the guide drum following said tape guide pin on said first tape guide arm successively to guide the tape at the second position spaced from the tape against the periphery of the drum to prevent the portion of the tape against the periphery of the guide drum from being touched by the remainder of the tape in the spread loop.

4. A magnetic recording and reproducing apparatus as claimed in claim 3 wherein said coupling means comprise pins on each of the other guide arms and pin engaging edges on said first guide arm spaced to engage said pins at points spaced along the movement of said first guide arm.

5. A magnetic recording and reproducing apparatus as claimed in claim 1 wherein, said take-out means comprises a movable take-out pin means including a take-out pin movable for taking the tape out of the cartridge in a narrow loop, and said spreading means comprises a swingable arm having a spreading pin thereon and movable to insert said spreading pin into said narrow loop of tape and to spread the tape into a wide loop.

6. A magnetic recording and reproducing apparatus as claimed in claim 5 in which said swingable arm is swingable vertically to insert the spreading pin into the narrow loop of the tape, and is swingable horizontally to spread the tape into the wide loop during the movement of said take-out pin means.

7. A magnetic recording and reproducing means as claimed in claim 6 in which swing means is connected to said swingable arm for urging said swinging movements, and said take-out pin means further comprises a carriage on which said take-out pin is mounted and movable in a straight line, and a stop pin on said carriage engaging said swingable arm and restraining said arm until said carriage has moved a predetermined distance to form said narrow loop of tape.

8. A magnetic recording and reproducing apparatus as claimed in claim 5 wherein, said take-out pin means further comprises a carriage on which said take-out pin is mounted, and a lead screw on which said carriage is mounted for movement along a straight line by the rotation of the lead screw.

* * * * *